Figure 1:
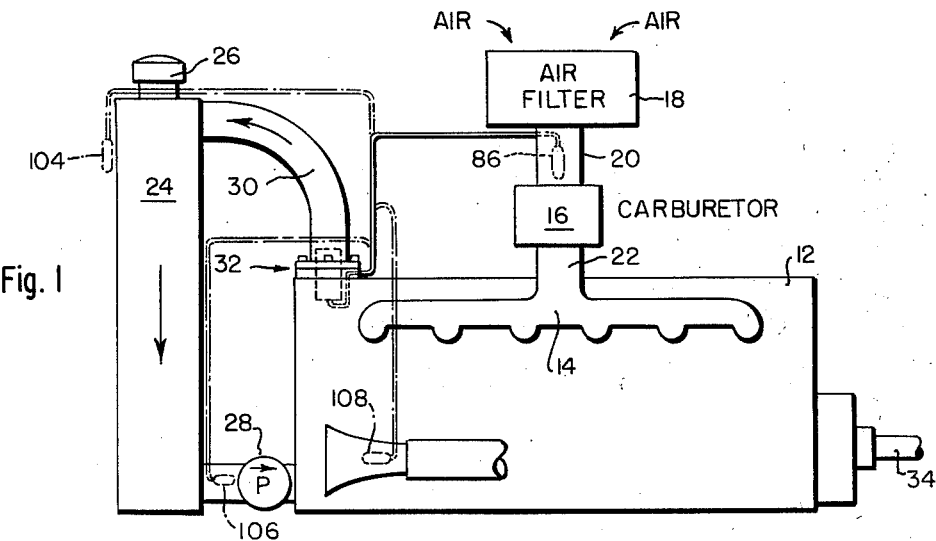

Dec. 17, 1957   J. A. WOODS   2,816,711
TEMPERATURE CONTROL OF COOLANT CIRCULATION
Filed July 7, 1955

INVENTOR.
JAMES A. WOODS
BY *Kenway Jenney*
*Witter & Hildreth*
ATTORNEYS

United States Patent Office 2,816,711
Patented Dec. 17, 1957

2,816,711

TEMPERATURE CONTROL OF COOLANT CIRCULATION

James A. Woods, Cohasset, Mass.

Application July 7, 1955, Serial No. 520,492

4 Claims. (Cl. 236—34)

The present invention relates generally to engine cooling controls, and more particularly to thermostatic controls for the flow of engine coolant between the coolant jacket surrounding the engine block and the radiator of an internal combustion engine.

Hitherto, the thermostatic devices most commonly used have been based upon the thermal properties of wax or a vaporizable liquid. Occasionally, they have been based upon the temperature modulus of a liquid that remains in the same state throughout the temperature region which the apparatus will experience in use. The controls most commonly used at present contain wax fills which have the advantage that they experience relatively large volumetric changes per degree of temperature variation, provided that such variation appears within a well-defined "transition" range. This range is a function of the specific wax formulation.

In the operation of internal combustion engines, it has been well established that the coolant circulation controls should ideally reflect the ambient temperature conditions. Thus, the flow of coolant through the engine should be allowed to increase to a higher rate at high ambient temperatures, and should be restricted to a lower rate at low ambient temperatures for any assumed coolant temperature. As a result, the characteristic properties of a wax fill are disadvantageous, in that the "transition" temperature remains fixed, and cannot be altered to reflect ambient changes. Accordingly, it has been common practice to design wax-filled thermal units for use in a particular season only, and to remove or replace the units when the average ambient temperature changes sufficiently.

It is one object of the present invention to provide engine coolant circulation controls that reflect the ambient temperature conditions and cause appropriate variations in the valve response automatically. With such controls, it would become unnecessary to remove or replace the thermostat with the seasons.

As an alternative to the use of wax, certain systems involving the use of vaporizable liquid fills have been developed. In these systems, a sealed space is partially filled with a vaporizable liquid which develops a vapor pressure reflecting the temperature of the medium into which the system is immersed. These vapor fill controls have not proven satisfactory in modern pressurized cooling systems because pressure changes in such systems produce undesired valve movements that in turn produce undesired variations in the engine operating temperature. They are therefore not as widely used as wax which is unaffected by pressure changes in engine coolant controls. Another disadvantage resides in the characteristics of vaporizable liquids, and particularly in the fact that no pressure can be developed in a vapor-filled system if the temperature in any part of it is reduced below the condensation point for the particular liquid. Therefore, to adapt such a system to reflect ambient temperature as well as coolant temperature it would in practice entail the use of two separate vapor-filled systems, operating upon fills of differing volatility, and require a consequent increase in complexity of apparatus and cost of manufacture. But, even with such adaptation, the system would still be subject to pressure variations as mentioned above.

It is accordingly another object of the invention to provide a thermostatic system of simple design, employing only a single thermal system and adapted to include portions situated both within the coolant circulating system and in a position subject to variations in the ambient temperature.

With the above objects in view, a principal feature of this invention resides in a thermostatic control device having a single thermal system entirely filled with a thermally expansible liquid, the thermal response of such system being greatly enhanced by a transducer or displacement actuator. This actuator makes possible the use of a relatively small amount of thermal liquid and a small thermal bulb to produce a large thermal response. Such a system is adapted to include portions subject both to the coolant temperature and to the ambient temperaure.

According to another feature, the thermal system can be used to control a valve of any desired form, for example a poppet or butterfly type of valve.

According to still another feature, the response of the thermal system varies in a more or less uniform fashion, and depends both upon the coolant temperature and the ambient temperature. The degree to which the ambient temperature affects the total response of the system is simply a function of the ratio of volumes of the thermal fill subjected to the two temperatures.

According to another feature, overtravel means are provided, whereby a valve having considerable lineal response per degree temperature change can be provided while yet having provision against damage in the event of abnormal temperature conditions.

Figure 2:
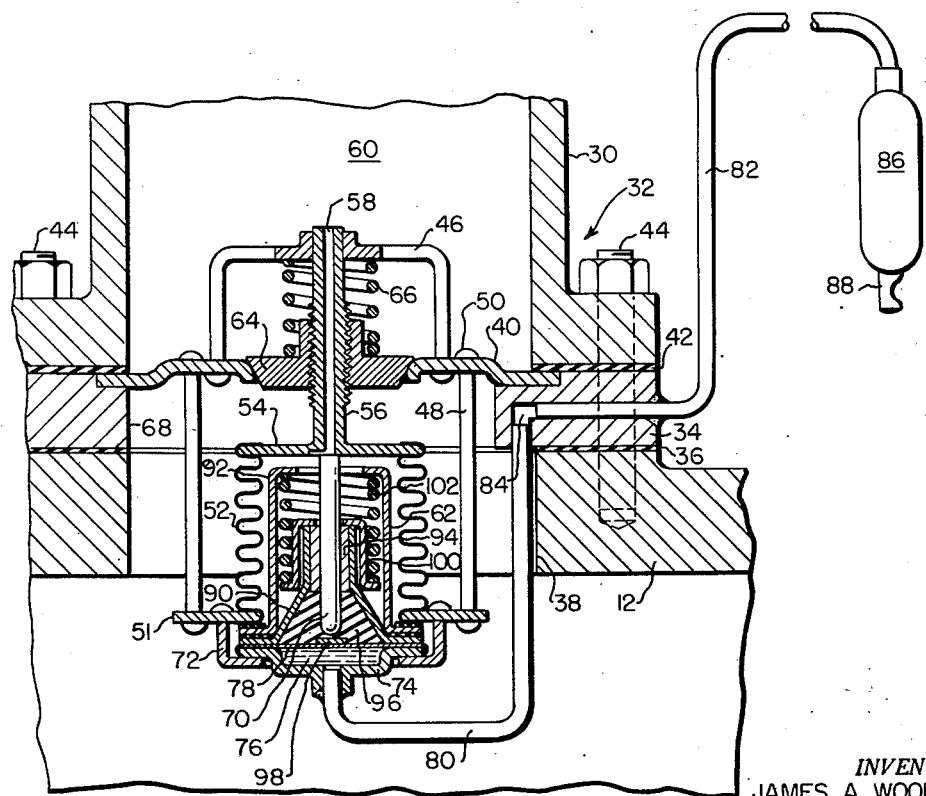

Other features of the invention reside in certain features of construction, and in novel combinations and modes of operation that will become apparent from the following description of a preferred embodiment thereof, when read in conjunction with the appended drawings, in which:

Fig. 1 is a schematic diagram illustrating the method of mounting the thermostatic control on an internal combustion engine; and Fig. 2 is a sectional elevation showing details of the construction of the valve and its associated thermal control system.

In Fig. 1 there is shown in schematic outline an engine block 12 of an automotive engine having an intake manifold 14, a carburetor 16, and an air filter 18. An air passage 20 leads from the air filter to the carburetor, where the fuel is mixed with the air in controlled proportion and passed through a throat 22 to the manifold 14.

The engine is also provided with a conventional cooling system in which a thermostatic valve according to the invention is employed. The system comprises a radiator 24 provided with a conventional pressure cap 26, a coolant pump 28, a water jacket forming an integral part of the engine block 12, and a return conduit 30 leading from the engine block to the top of the radiator 24. The conduit 30 is illustrated as being of metallic form, as indicated in Fig. 2, although it will be appreciated that other forms such as flexible, non-metallic hose may be used if desired.

The circulation of coolant fluid is in the conventional direction indicated by the arrows in Fig. 1. The rate of circulation depends upon the opening of a thermostatic valve 32 mounted in the upper opening of the engine block, and the pressure developed by the pump 28. The pump is normally coupled by a V-belt or other suitable means to a crank shaft 34; hence its speed is not influenced by thermostatic conditions.

The details of the valve structure are shown in Fig. 2. The essential parts are mounted upon a ring-shaped support member 34 which is mounted with a fluid-tight gasket 36 over the opening 38 in the engine block 12. The member 34 has an upper annular recess into which is received a seat member 40. The conduit 30 is fitted with a gasket 42 over the seat member 40, and bolts 44 are passed through the assembly and into suitably threaded holes in the engine block 12 to hold the parts firmly together in a fluid-tight manner.

The essential elements of the valve and pressure-motion transducer are supported upon the seat member 40 by means of suitable spiders 46 and 48. These spiders are provided with tabs such as 50 which are received through small slots punched in the seat member 40 and then twisted or bent over to prevent retraction through the slots.

The spider 48 has a ring 51 secured at its lower end, about which is formed an end convolution of a flexible metallic bellows 52. The bellows serves to balance the pressure on the valve and is preferably of the form having two open ends, with the upper end being formed about the flanged end portion 54 of a spindle 56. The spindle 56 has a bore 58 by which a space 60 on the downstream side of the valve is in continuous communication with a space 62 within the bellows.

A valve member 64 is threaded onto the spindle 56. A compression spring 66 bears at one end upon the hub of the spider 46, and at the other end upon the valve member, tending to urge it to the closed position.

The effective areas of the bellows and the valve member are substantially equal, whereby the position of the valve member is unaffected by the pressure differential between the upstream space 68 and the downstream space 60. As indicated above, the normal position of the valve member 64 is fully seated so long as the net force acting thereupon is the net force due to compression of the spring 66 and the spring action of the bellows 52.

Mechanism is provided to unseat the valve member 64 by a metallic pin 70 which bears upon the lower face of the flange 54 of the spindle. This pin is the working element of a sub-assembly supported upon the ring member 51 by means of a spider 72. This sub-assembly consists of two parts: a thermal unit and a displacement amplifier. The thermal unit consists of a base member 74 having an upper annular recess to form a space 76, a metallic diaphragm 78, which is either flat or suitably corrugated and hermetically sealed to the base 74 by fusion, i. e., soldering, brazing or welding, two lengths of capillary tubing 80 and 82 joining the base member 74 and the support 34 through an access hole 84 drilled in the latter, and a thermal bulb 86. The bulb 86 may be of conventional form, having an inner sealed space filled with thermal fluid, and a short length of filling tube 88, which is crimped and soldered, brazed or welded after the system is filled in a conventional manner.

The thermal system is entirely filled with a thermally responsive liquid that remains in the same state under all conditions encountered in normal storage and use. It will be observed that the system is hermetically sealed in the strictest sense, that is, by actual metallic fusion. It is important that no gas be trapped in the thermal fill; and accordingly, the thermal unit is filled at the factory in a vacuum chamber where it is first reduced to a few microns of pressure and then filled with thermal liquid that has been similarly evacuated.

The thermal unit is assembled onto the ring 51 with a shell 90 and an open-ended metallic cap 92 by means of suitable gaskets, these parts being clamped together by the spider 72. An over-travel sleeve 94 is received into an upper cylindrical portion of the shell 90, and forms a sleeve bearing for the pin 70.

Within the shell 90 and surrounding the pin 70 is a body 96 of substantially incompressible elastomeric material, such as rubber or a suitable rubber substitute. Imbedded in this body adjacent the end of the pin 70 is a wafer of tough, somewhat resilient material 98 such as "Teflon" (a tetrafluoroethylene polymer) or the like. This wafer serves to protect the diaphragm 78 from damage through the pin 70 bearing upon it, although under normal conditions the apparatus is designed to permit a full stroke of the pin without its touching the wafer 98.

The over-travel sleeve 94 is retained at its upper end by a flanged perforated cup 100, which is urged downwardly by a compression spring 102 bearing at its upper end upon the stationary cup 92.

As will subsequently appear, the device is operated through variations in the pressure within, and displacements of, the elastomeric body 96. This pressure tends to urge the over-travel sleeve 94 upwardly, and to compress the spring 102. However, the spring 102 is designed to resist further compression at all pressures within the body 96 that exist while the pin 70 is at any position intermediate its stroke limits; hence, at these pressures the cup 100 is at rest upon the end of the shell 90.

Thus it will be seen that the thermal system comprises essentially a space 76 filled with thermal fluid, which is immersed in and subjected to the temperature of the coolant fluid in the engine block 12, and a thermal bulb 86 connected therewith in a single, hermetically sealed system. The bulb 86 is preferably subjected to the ambient air temperature, and is accordingly preferably supported within the passage 20 leading from the air filter to the carburetor. Alternatively, the bulb 86 may be placed in front of the radiator 24, as indicated at 104, or in the outlet from the radiator to the water pump 28 as indicated at 106, since if the radiator is efficient the temperature of the coolant will have been reduced to a value near the ambient air temperature as it leaves the radiator. A third alternative position is in the ventilation air scoop for the passenger compartment as indicated at 108.

In operation at a fixed ambient air temperature, the thermostatic valve functions in a manner generally similar to that of a conventional valve. The control is provided by the thermal fluid in the space 76. As the temperature of the coolant in the engine block increases, the thermal fluid expands against the diaphragm 78, forcing it upwardly to compress the elastomeric body 96. The pressure of the body 96 against the end of the pin 70 forces the pin upwardly against the end of the spindle 56 against the reaction of the spring 66. Thus the valve opening increases with coolant temperature to allow an increased circulation of coolant through the radiator 24.

Ultimately, the upper end of the valve member 64 reaches and is arrested by the hub of the spider 46. If the coolant temperature should rise above the value at which the valve is thus fully opened, the over-travel device begins to function. Thus, while the pin 70 is prevented from further movement upwardly by reason of its bearing upon the arrested spindle 56, the over-travel sleeve 94 moves upwardly against the reaction of the spring 102 to relieve the pressure within the body 96.

The stroke limits of the pin are defined, respectively, by the fully seated position of the valve member 64, and its fully open position in which it rests against the hub of the spider 46. Its position within these limits is a function, not only of the coolant temperature as previously described, but also of the ambient air temperature, since the thermal unit is responsive to the total volumetric change within the thermal fill, which includes the bulb 86. Thus, a reduction in the ambient air temperature tends to shrink the volume of thermal liquid, and consequently to close the valve member 64. Similarly, an increase in the ambient air temperature tends to expand the volume of thermal liquid, and consequently to open the valve member 64. By proper adjustment of the volume of the bulb 86 in relation to the space 76, it is possible to make the unit more or less responsive to the ambient air temperature, as desired. Thus, complete freedom of choice in design is permitted.

It will be observed that the valve position is substantially independent of variations in the average pressure within the coolant circulating system. Also, by reason of the bore 58 through which the downstream side of the valve communicates with the space 62 within the bellows, the circulating pressure differential of the pump 28, although fully applied between the opposing sides of the valve member 64 when it is seated, is balanced out by reason of its application between the upper and lower surfaces of the flange 54 integral with the valve member.

From the foregoing description it will be appreciated that a relatively simple and highly efficient thermostatic valve has been provided for the coolant circulation system of an internal combustion engine, the valve having a response which may be made a function, not only of the coolant temperature, but also of the ambient air temperature, whereby optimum cooling conditions can be maintained over a wide range of ambient air temperatures. Changes of the thermostatic control with season are therefore obviated, and adjustment is continuous and automatic, requiring only such attention as may be incident to initial installation and normal repair of the mechanical parts.

Having thus described the invention, I claim:

1. A thermostatic coolant circulation control valve for internal combustion engines having, in combination, a valve member, a seat for the valve member, and an actuator comprising a thermal unit and a displacement amplifier, said thermal unit being entirely filled with a thermally expansible liquid, hermetically sealed in metal and having first and second communicating portions respectively situated in position to sense changes in the ambient air temperature and the coolant temperature, said first portion being substantially isolated from the circulating coolant and said second portion having a wall formed by, a flexible metallic diaphragm, and said displacement amplifier including a shell forming a space with said diaphragm comprising a wall thereof, an overtravel sleeve slidably received in an opening of the shell, resilient means urging the sleeve into the shell, a metallic pin slidably supported in the sleeve and bearing upon the valve member, and a body of substantially incompressible elastomeric material substantially filling said space and lying adjacent the pin and sleeve.

2. A thermostatic coolant circulation control valve for internal combustion engines having, in combination, a valve member having a fluid path connecting the upstream and downstream sides thereof, a seat for the valve member, a flexible metallic bellows having one end supported in fixed relation to the seat and the other end engaged with one side of the valve member whereby the interior of the bellows is in communication with the opposite side of the valve member, and an actuator supported in fixed relation to the seat and comprising a thermal unit and a displacement amplifier, said thermal unit consisting of an hermetically sealed metallic system entirely filled with a thermally expansible liquid, said system including an enclosure closed by a flexible metallic diaphragm and situated in position to sense the coolant temperature, and said displacement amplifier including a shell supported in fixed relation to the valve seat and forming a space with said diaphragm comprising a wall thereof, a metallic pin slidably supported by said shell, extending into the interior of the bellows and bearing upon the end of the bellows engaged with the valve member, and a body of substantially incompressible elastomeric material substantially filling said space and lying adjacent the pin.

3. A thermostatic coolant circulation control valve for an internal combustion engine having, in combination, a valve member, a seat for the valve member, and an actuator comprising a displacement amplifier and a thermal unit, said thermal unit having an hermetically sealed metallic system entirely filled with thermal liquid and including first and second communicating portions respectively situated in position to sense the air temperature adjacent the engine and the coolant temperature at the inlet side of the valve, said first portion being substantially isolated from the circulating coolant and said second portion having a wall formed by a flexible metallic diaphragm, and said displacement amplifier including a shell enclosing a space with said diaphragm forming a wall thereof, a metallic element slidably supported by the shell and bearing upon the valve member, and a body of elastomeric material substantially filling said space and lying in contact with said element.

4. A thermostatic coolant circulation control valve for internal combustion engines having, in combination, a valve member having a fluid path connecting the upstream and downstream sides thereof, a seat for the valve member, a flexible metallic bellows having one end supported in fixed relation to the seat and the other end engaged with one side of the valve member whereby the interior of the bellows is in communication with the opposite side of the valve member, and an actuator supported in fixed relation to the seat and comprising a thermal unit and a displacement amplifier, said thermal unit consisting of an hermetically sealed metallic system entirely filled with a thermally expansible liquid, said system including an enclosure closed by a flexible metallic diaphragm and situated in position to sense the coolant temperature, a portion substantially isolated from the circulating coolant and situated in position to sense the air temperature adjacent the engine and capillary tubing joining said portion and enclosure, and said displacement amplifier including a shell supported in fixed relation to the valve seat and forming a space with said diaphragm comprising a wall thereof, a metallic pin slidably supported by said shell, extending into the interior of the bellows and bearing upon the end of the bellows engaged with the valve member, and a body of substantially incompressible elastomeric material substantially filling said space and lying adjacent the pin.

References Cited in the file of this patent

UNITED STATES PATENTS

| 2,101,369 | Jorgensen et al. | Dec. 7, 1937 |
| 2,208,149 | Vernet | July 16, 1940 |
| 2,268,083 | Rapuano | Dec. 30, 1941 |

FOREIGN PATENTS

| 557,211 | Germany | Aug. 19, 1932 |
| 702,868 | France | Jan. 27, 1931 |